United States Patent [19]

Freeman

[11] 4,207,158
[45] Jun. 10, 1980

[54] ELECTRICALLY AUGMENTED VACUUM FILTRATION

[75] Inventor: Mark P. Freeman, Darien, Conn.

[73] Assignee: Dorr-Oliver Incorporated, Stamford, Conn.

[21] Appl. No.: 40,351

[22] Filed: May 18, 1979

Related U.S. Application Data

[60] Division of Ser. No. 898,234, Apr. 20, 1978, which is a continuation-in-part of Ser. No. 697,142, Jun. 17, 1976, Pat. No. 4,107,026.

[51] Int. Cl.$^2$ .............................................. B01D 13/02
[52] U.S. Cl. ........................... 204/180 R; 204/299 R; 204/300 R; 210/406
[58] Field of Search ........... 204/180 R, 299 R, 300 R, 204/152; 210/406, 416 R

[56] References Cited

U.S. PATENT DOCUMENTS

| | | | |
|---|---|---|---|
| 1,435,886 | 11/1922 | Acton et al. | 204/180 R |
| 2,900,320 | 8/1959 | Metcalfe et al. | 204/300 |
| 2,944,952 | 7/1960 | McMinn et al. | 204/180 R |
| 3,642,605 | 2/1972 | Chenel et al. | 204/300 |
| 3,679,565 | 7/1972 | Gilchrist | 204/180 R |
| 3,972,799 | 8/1976 | Taylor et al. | 204/180 R X |
| 3,980,547 | 9/1976 | Kunkle | 204/180 R X |
| 4,048,038 | 9/1977 | Kunkle | 204/180 R X |

Primary Examiner—Arthur C. Prescott
Attorney, Agent, or Firm—Harold M. Snyder; Burtsell J. Kearns

[57] ABSTRACT

A process for dewatering a suspension of solids in an electric field controllably maintained between opposing electrode structures, causing the solids to migrate relative to the carrier liquid to form a layer or cake on one set of electrode structures while withdrawing carrier liquid under vacuum in the opposite direction through the liqid pervious wall of hollow, counterelectrode structures. A selected electrolyte is pumped through the hollow electrode structure on which the cake is formed to continuously bathe the electrode element therein in said electrolyte. Vacuum is applied to the electrolyte in said electrode structure to remove gases evolved at the electrode element. The cake material is detached from the electrode structure and recovered.

7 Claims, 12 Drawing Figures

FIG. 11

ELECTRICALLY AUGMENTED VACUUM FILTRATION

This application is a division of Application Ser. No. 898,234, filed Apr. 20, 1978; the latter application being a continuation-in-part of application Ser. No. 697,142, filed June 17, 1976, now U.S. Pat. No. 4,107,026 issued Aug. 15, 1978.

This invention relates to the dewatering of suspensions of finely divided or colloidal solids in a carrier liquid, for example a clay suspension in water, by application of vacuum, with the dewatering process augmented by an electric field created by passing an electric current through the suspension by means of a pair of spaced live electrodes, a cathode and an anode, submerged in the suspension.

Finely divided solids in suspension may thus be dewatered directly to an extent not attainable as economically and conveniently by conventional dewatering means. Depending upon respective industrial demands, the product thus attainable may be in the form of a cake material or of a slurry of a desired or specified solids concentration.

According to the underlying concept of this invention, under influence of the field, the solids in suspension between the electrodes, and carrying their inherent electric charge which may be either negative or positive depending upon the type or nature of the material, will migrate relative to the carrier liquid towards a respective electrode, a phenomenon known as electrophoresis. As these migrating solids reach the electrode surface, they will collect and settle upon one another in a layer, even as interstitial liquid or water is being further displaced therefrom incident to densification of the solids layer by what is termed electro-osmosis. Eventually, this results in the formation upon the electrode of a recoverable layer of material dewatered and compacted sufficiently to undergo removal from the electrode, for instance during exposure from the suspension. Also the recovery of dewatered solids as a suspension, that is, in a still fluid state, is attainable economically directly from the electro-dewatering apparatus at a relatively high solids concentration, not otherwise attainable by conventional dewatering apparatus such as cyclones, centrifuges, or filters. At a certain solids concentration thus achievable, the product will meet a special industrial demand. A slurry product of a desired solids concentration is also attainable by blending recovered cake material with feed slurry or with overflow suspension from the treatment tank of the electro-dewatering apparatus.

Simultaneous with the aforementioned electrophoresis effect, the electric current passing through the suspension produces a proportional amount of dissociation of carrier water into hydrogen and alkali at the cathode and oxidation reaction products, for example, oxygen and acid, at the anode, the amounts depending upon the controllable density of the electric current.

It is an object of this invention to provide an improved anode electrode structure, a system incorporating that anode, a mode of operation for that anodic electrode in receiving cake material deposited thereon which is effective to protect the electrode from the corrosive nature of the environment and the operating conditions.

The cake product thus obtainable economically, continuously, and uniformly under controlled conditions may be repulped so as to be fluid and pumpable, although of a relatively high solids concentration not otherwise obtainable by conventional dewatering apparatus. An example of the industrial demands is for a well dispersed colloidal clay suspension of about 70% solids concentration for shipment in tank cars, obtainable economically by this invention, as distinct from the demand for a spray dried product in bags or bulk. However, the operation of the electro-dewatering apparatus may also be conducted in a manner whereby a slurry of a desired solids concentration is producible directly in the form of the overflow from the treatment tank.

In order to carry out the process of the invention, self-contained hollow electrode structures are provided normally submerged in the suspension but bodily removable for inspection or other purposes. These hollow electrode structures have either liquid-pervious or ion-pervious wall surfaces, preferably comprising a chemically and electrically neutral filter media or permeable porous membrane backed by a supporting grid, thus presenting a planar electrode surface. Within the enclosure defined by the aforesaid wall surfaces, the electrode member is positioned, protected from direct contact with the suspension.

In the case of the electrode having a liquid-pervious wall, a source of vacuum connected to the interior of the hollow electrode structure provides a controllable pressure differential producing a flow of carrier liquid through the filtration surfaces, while the solids migrate in the opposite direction, under the influence of the electric field, towards the counter electrode. Filtrate liquid, that is, carrier liquid freed of solids, may be withdrawn or pumped from the interior of the liquid-filled hollow electrode structure at a controllable rate.

A self-contained counter electrode structure collects suspended solids in the form of a layer or a cake on an ion-permeable electrode surface corresponding to that of the liquid permeable surface of the opposed hollow electrode structure. This counter electrode is thus also a hollow structure and comprises an electrode element positioned within a chamber having ion-permeable walls. The chamber of the counter electrode structure is filled with an electrolyte and the electrode element is immersed therein. The electrolyte is specially selected for its conductivity and compatibility with the electrode element. By "compatibility" is meant the non-corrosive character of the electrolyte under the conditions that prevail within the hollow counter electrode structure. Since a component of the electrolyte is discharged or evolved at the electrode element during electrofiltration, provision is made for a flow of electrolyte into and through the chamber of the counter electrode so that a relatively constant predetermined electrolyte composition is maintained.

The ion-permeable wall of the counter electrode structure comprises a chemically and electrically neutral filter media or permeable porous membrane which, if film-like in nature or otherwise requiring support, may be backed by a chemically and electrically neutral grid so that a planar electrode filter surface is presented to the slurry being treated. Since the cake will form on the counter electrode during electrofiltration and must be removed by contact with doctoring blades, a friction cage is provided to protect the filter medium from direct contact with the doctoring blades. The friction cage comprises a thin, open screen-work of relatively hard material for contact with the doctoring blades. For the purpose of cake recovery, the counter electrode structure may be raised to a position of emergence from the suspension, with the layer of collected solids or cake layer adhering thereto. Since the electrolyte remains within the counter electrode in the raised position, a vacuum is applied internally of the electrode to reduce the pressure on the filter media and so prevent loss of electrolyte and/or rupture of the filter media. When the counter electrode is immersed in operation, the vacuum applied internally serves to remove gaseous products, such as chlorine, evolved at the electrode member.

Provision is made for the application of cake removal devices constructed and arranged for intercepting the cake material stripped or scraped from the electrode surface during its upward or downward return movement to resubmergence in the suspension. Hence, these devices preferably comprise conveyor means directly cooperating with cake stripping or scraping means, to allow for rapid delivery of the cake material away from the apparatus or treatment tank.

Provision is also made for manual or automatic control whereby an appropriate rate of filtrate flow through the aforementioned hollow liquid permeable electrode structure is maintainable relative to the rate of migration of the solids in the opposite direction.

For that purpose, one embodiment provides an automatic control system wherein the vacuum applied to the liquid permeable electrode structure is held at a constant value as defined by an intermediate or normal filtrate level held by the vacuum. Any variation occurring in this liquid level, is utilized as a master control or indicator factor, for correctively adjusting, through relay action, any one or more of certain individual control factors in the system towards restoring the filtrate liquid level. Such factors are the current density, or the filtrate pumping rate, or the vacuum, although the vacuum is surprisingly of but modest influence.

Thus, the electrode current density, or the filtrate pumping rate, or the vacuum could be adjusted towards restoring the filtrate level held by the vacuum, thereby maintaining between the electrodes a desired rate of migration of the solids relative to the counter flow of the carrier liquid.

When utilizing the electric field adjustment for control purposes, increasing the current density will accelerate the rate of migration of the suspension solids towards cake formation, while decreasing the current density will correspondingly slow down the rate of migration of the particles, relative to the movement of the carrier liquid in the opposite direction.

In practical terms, this means that, should the rate of migration of some of the particles be too slow relative to the filtration throughflow rate of carrier liquid, this would allow such lagging particles to settle as a coating on the liquid permeable filter media. This in turn would increase the throughflow resistance of the filter media, producing a corresponding fall in the filtrate level held by the vacuum. This deviation is utilized through the aforementioned relay action, to increase the current density to the extent of reducing the coating on the filter media, and restoring the filtrate level to normal. A similar control limit may be set, whereby an undue lowering of the filtrate level will be translated into a corresponding decrease of the current density with concurrent increase of the coating thickness, until the level is again restored to normal. For practical purposes, the coating may vary as between 1/16 inch and ⅛ inch.

Under extreme conditions, for instance where the rate of solids migration is so great that a corresponding filtrate throughflow rate would become excessive, in that situation, the controls may operate in a manner to allow for lagging solids to settle on the surface of the filter media in a very thin layer, thus slightly increasing the throughflow resistance and correspondingly lower the throughflow rate.

It should be understood that manual control of the process is entirely satisfactory in many applications and deposition rate is controlled usually by adjusting the feed rate or current density in response to visual observation of the character of the product. Thus, if the repulped product is too thin and watery, the feed rate in decreased (or the current density increased) and if the product is too thick, the feed rate is increased (or the current density decreased).

In one practical embodiment, the treatment tank receives a continuous feed supply, with overflow means determining the normal level of the body of the suspension in the tank.

In that embodiment, a series or multiplicity of self-contained cathodic and anodic electrode structures arranged in alternation are positioned in mutually spaced relationship in the suspension, with their planar electrode surfaces parallel to one another. The hollow electrodes with the liquid pervious walls deliver the filtrate liquid as above set forth while the hollow electrodes with ion-pervious walls receive a deposit of cake material. An overhead traveling carriage is operable to stop at each of the electrode structures where a layer of cake material is ready for removal. The carriage is equipped with hoisting mechanisms for raising such an electrode to a position of emergence. Preferably, the carriage is also unitary with a combination of mechanisms whereby the cake material is stripped from the electrode, for instance, by means of doctor blades, and intercepted while the electrode is exposed from the suspension, for instance, while being lowered back into submergence. The material being stripped is intercepted by conveyor means adapted to carry the material directly away from the treatment tank. The carriage together with its combined hoisting, stripping, and conveyor mechanisms having completed one such cake removal operation, is then moved on to the next electrode awaiting cake removal.

Other features and advantages will hereinafter appear.

In the example of FIGS. 1 to 4 there is shown a sequence of schematic views of the electrically augmented vacuum dewatering operation according to one embodiment of the invention, including a schematically shown control system; wherein negatively charged solids migrate to the ion-pervious hollow anodic electrode structure, and the resulting cake formation is recovered therefrom, while carrier liquid passes off through the liquid-pervious hollow cathodic electrode structure functionally connected to a filtrate flow control system, and wherein.

In the operation of the electro-dewatering system one may encounter suspensions wherein the respective solids may carry predominately either negative or positive charges. The following explanation of the principle of the invention is offered on the assumption of a prevailing negative charge such as carried, for example, by the solids of a clay suspension.

One embodiment of the electro-dewatering system of this invention is illustrated by way of example and schematically in FIGS. 1 to 4.

In this embodiment of the dewatering system, the apparatus comprises the dewatering unit itself along with its structural and mechanical appurtenances, collectively designated by the letter "D", and a filtrate flow control system "S-1" the purpose and function of which will be furthermore set forth below.

The dewatering unit "D" in its relatively simplest form, comprises a tank 10 provided with a supply connection 11 for feeding the suspension to the tank. For the present example, this may be a clay suspension or a suspension of uniformly dispersed finely divided negatively charged solids of colloidal size. The required depth of the body of the suspension in the tank is defined and insured by an overflow edge 12 associated with an overflow receiving launder 13, providing for full submergence of electrode structures in the tank. Accordingly, feed suspension is supplied at a rate such that an excess will continuously overflow from the tank, and so that there will be an everchanging body of the suspension in the tank. Moreover, a circulating pump 14 connected to the tank as at 14a and 14b, keeps the tank contents in motion, thus insuring suitable dispersion of the solids in suspension, and proper and uniform functioning of the cathodic and anodic electrode surfaces exposed to the suspension in the tank.

In this embodiment, the invention provides cathodic and anodic electrode surfaces in the form of self-contained electrode structures of planar configuration, parallel to one another, each being constructed and arranged so that it may be raised vertically in its own plane to a position of emergence from the suspension, and again to be lowered back into the suspension.

On the foregoing premises, that is with suspended solids such as clay carrying a negative charge, a self-contained anodic electrode structure 15 of positive polarity and of hollow construction, occupies the center, alternatively designated by letter "A".

Figures 4, 4A:
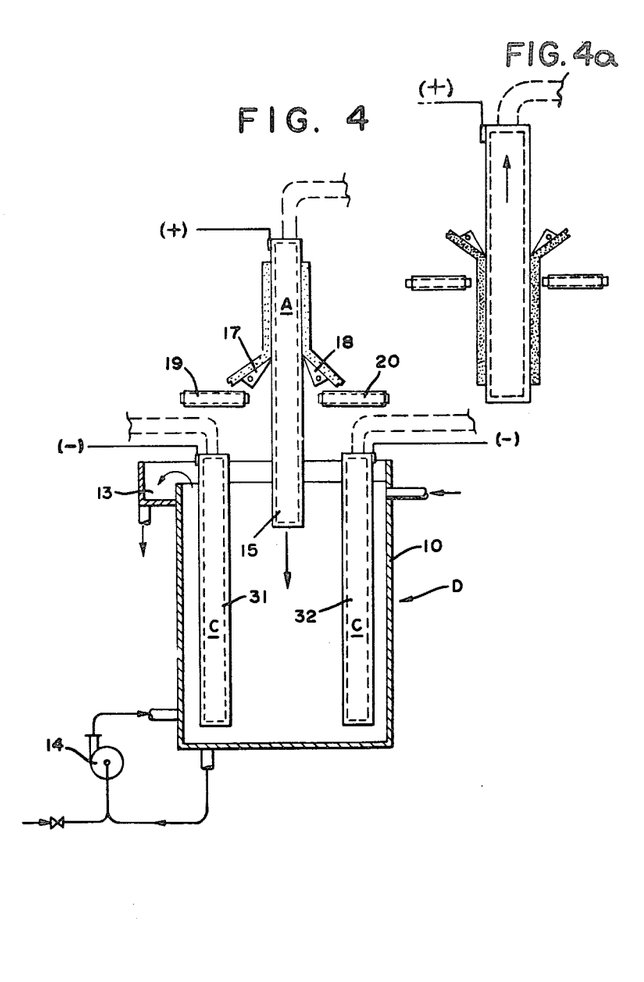
FIG. 4 shows the anodic electrode structure being lowered back into the suspension, with the doctor blades positioned for stripping the cake layer onto respective conveyor means.
FIG. 4a illustrates an alternate arrangement for effecting the cake stripping operation.

Provision is made for a vertical guide arrangement in order to move this electrode structure vertically in its own plane to a position of emergence from the suspension, and to lower it back into submergence. Also provided are disposal devices whereby cake material formed on the anodic electrode surfaces from the suspension, is stripped and carried away during the downward return movement of the electrode structure. In one embodiment, these disposal devices are schematically shown to comprise a pair of symmetrically disposed doctor blades 17 and 18 swingable about their horizontal axes as between neutral position and cake stripping position. The cake material thus being stripped may be carried away by conveying means indicated by respective band conveyers 19 and 20. Yet, by way of reversal, the stripping devices may also be constructed and arranged in a manner whereby the cake stripping and removal is effected incident to the upward movement of the electrode structure to emergence, as illustrated in FIG. 4a.

Figure 5:
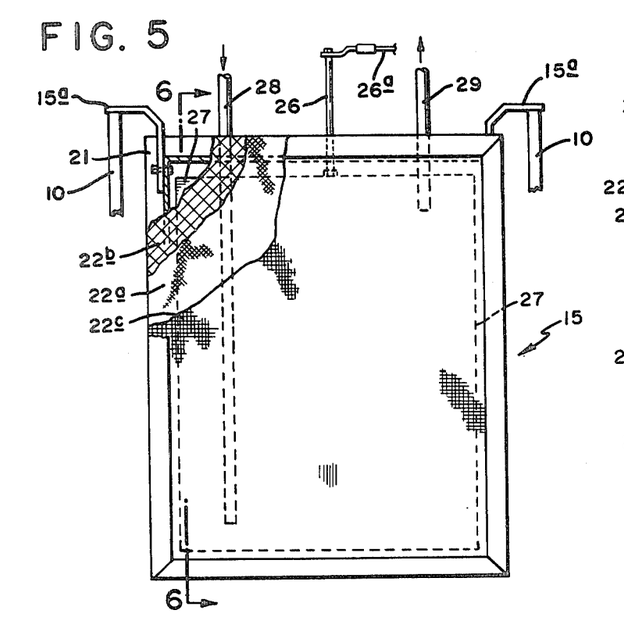
FIG. 5 is an enlarged detail view, taken on line 5—5 in FIG. 1 of a hollow anodic electrode structure.
Figure 6:
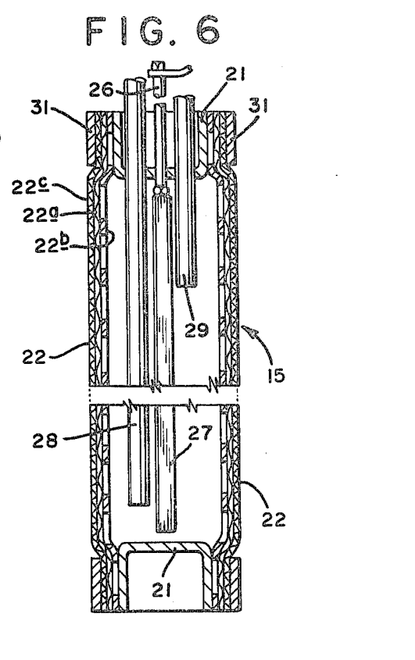
FIG. 6 is a vertical sectional view of the anodic electrode structure, taken on line 6—6 in FIG. 5.

In greater detail shown in FIGS. 5 and 6, the anodic electrode structure 15 is of a hollow construction comprising a rectangular frame member 21 and a pair of ion-permeable walls 22 connected to the frame member 21. Frame member 21 is of an outwardly open U-shaped cross-section adapted for securement thereto of the ion-permeable walls. Each of the ion-permeable walls is a multi-layered assembly comprising a filter media 22a, a supporting grid 22b and a protective cage 22c, and adapted for deposit thereon of negatively charged solids from the suspension, as a layer or a cake formation.

Fixed to the upper end of frame member 21 are a pair of support brackets 15a for positioning and supporting the electrode structure 15 in the tank indicated at 10.

A terminal of positive polarity is provided in the form of vertical rod 26 extending into the interior of this electrode structure 15, and connected therein to the electrode 27 while the exposed top end portion of this rod has a cable connection 26a.

It will be understood that the frame member 21 and the wall members 22 of the electrode structure 15 are electrically neutral and are, consequently, composed of non-conductive materials such as plastic, or are insulated from contact with the electrode 27 and the electric conduits 26 and 26a.

Provision is furthermore made for filling the interior of this electrode structure with a suitable electrolyte (anolyte). In order to maintain a relatively constant electrolyte composition during operation of the electrically augmented vacuum filter and to flush out solids which find their way into the anode compartment, a flow of fresh electrolyte is maintained through the electrode structure. The apparatus for maintaining this electrolyte flow, in simplest form, may be a gravity feed system in which an elevated electrolyte supply tank is connected to the electrode structure by a supply conduit and a waste conduit leads from the electrode structure, perhaps to a waste tank. Gas evolved at the anode is carried out with the depleted electrolyte. Electrolyte circulation may be provided in a more sophisticated system. In this case (see FIG. 11), electrolyte is circulated through the electrode 15 by means of inlet connection 28 and outlet connection 29 to maintain a relatively constant electrolyte composition during operation of the electrically augmented vacuum filter. The outlet connection 29 is shown connected to the receiver 61 in which gas evolved within the electrode 15 is removed from the system through vacuum line 62 having a valve 63 therein, while the electrolyte is forwarded to feed tank 66 through conduit 64. In the feed tank 66 additional electrolyte may be introduced from make-up tank 73 to replace that consumed in the process. Make-up tank 73 is connected to conduit 64 through line 76 in which there is located a control valve 79. Pump 71 in inlet connection 28 withdraws electrolyte from feed tank 66 and forwards it to the electrode structure 15. Excess depleted electrolyte may be removed from the system through overflow outlet 69.

Figure 11:
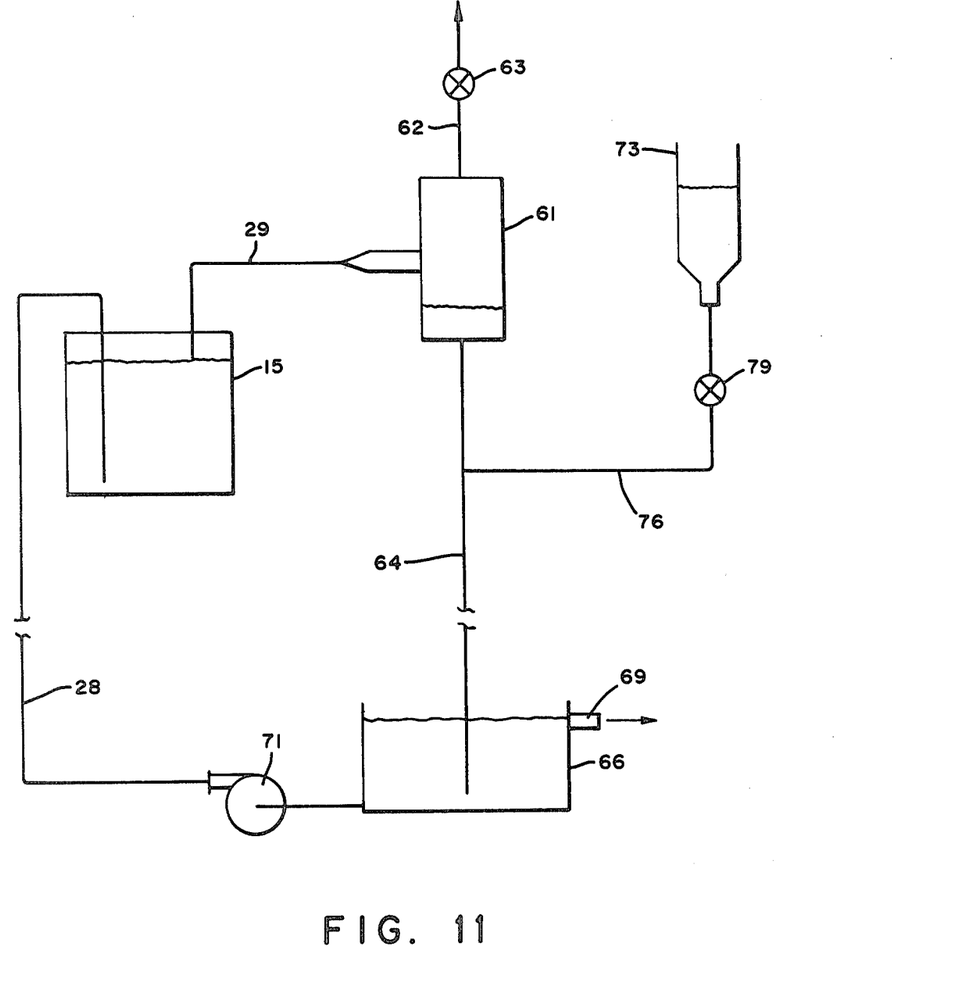
FIG. 11 is a diagrammatic showing of an electrolyte circulation system.

In the above circulation system a vacuum pump (not shown) operating in line 62 for removing gas is required as well as a pump 71 for moving electrolyte. Line 64 is a barometric leg and balances the vacuum necessary to withdraw the gas evolved in anode 15.

The preferred electrolyte for service in the anode electrode structure 15 is a 1 N solution of sodium chloride. At the electrode 27, with such an electrolyte, chlorine gas is evolved for discharge ultimately through vacuum line 62. This environment is found to be quite compatible with electrodes formed of titanium and coated with commercially available materials such as ruthenium, which, in situations where oxygen is evolved at the electrode, have been found to be subject to severe corrosive attack. Carbon electrodes may also be used.

The chlorine gas evolved at the anode is extracted from the system through the vacuum line and must be disposed of or utilized in some fashion at this point. This chlorine may be reintroduced at the cathodes where it will tend to suppress hydrogen formation (by formation of NaCl), thus minimizing or eliminating the problem of disposing of or utilizing the hydrogen and caustic by-products, while reducing the problem of disposing of chlorine gas. It is also possible to mix the chlorine gas with catholyte to generate a neutral hypochlorite solution which may be used as a by-product for bleaching or other purposes.

Another alternative is to use a special vacuum pump to concentrate pure chlorine gas for use or sale elsewhere.

While a sodium chloride solution is the preferred electrolyte (anolyte) it is also possible to employ various neutral salts or mineral acids, such as sodium sulfate, potassium sulfate or $H_2SO_4$, as the electrolyte and still obtain passible performance. In some circumstances an acid cake is desired and, in that case, HCl should be employed as the electrolyte. In other cases, a neutral cake is desired and, for such cake, neutral or alkaline electrolytes should be used, such as a mixture of sodium bicarbonate and sodium chloride (1 N of each).

As has been mentioned, the anode structure is lifted out of the tank for removal of accumulated cake. It will be appreciated that the electrolyte within the electrode structure will, in the raised position, tend to exert substantial pressure outwardly on the walls of the electrode structure. Under this pressure, electrolyte could be forced outward through the filter media or the filter media might rupture. However, if the vacuum is maintained in receiver 61, this negative pressure will relieve the pressure on the walls of the electrode structure and prevent loss of electrolyte and/or rupture of the filter media.

Furthermore, in this embodiment, the central anodic electrode structure is flanked by a pair of self-contained cathodic counter electrode structures 31 and 32 of negative polarity, and spaced a distance "d" from the anodic center electrode.

These cathodic electrodes alternatively designated by the letter "C", are of a particular hollow construction designed to allow carrier liquid from the surrounding suspension to be drawn through liquid-permeable electrode walls into the interior of this hollow electrode structure, and thence to be drawn or pumped out to disposal. The interior of these cathodic electrode structures communicates with the aforementioned filtrate flow control system "S-1" the purpose, function, and operation of which will be set forth furthermore below.

Figure 7:
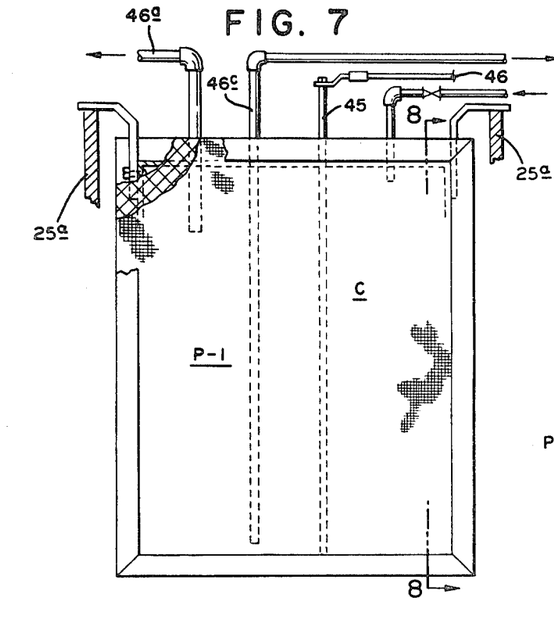
FIG. 7 is an enlarged detail view taken on line 7—7 in FIG. 1, of the cathodic electrode structure comprising filter media backed by a supporting grid.
Figure 8:
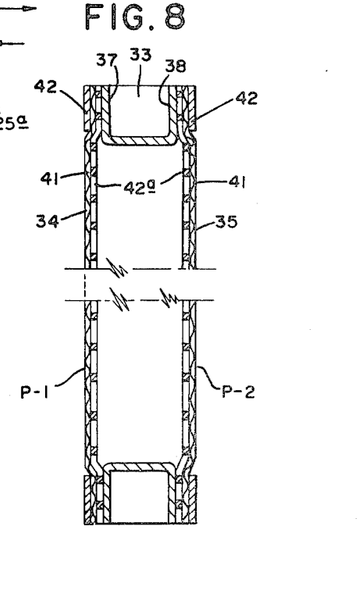
FIG. 8 is a vertical sectional view of the cathodic electrode structure, taken on line 8—8 in FIG. 7.

In greater detail such as shown in FIGS. 7 and 8, these cathodic electrode structures 31 and 32 comprise a rectangular frame 33 similar in size to that of the central anodic electrode structure described above. However, these hollow cathodic electrode structures have liquid permeable walls 34 and 35 connected to the frame member 33, thus representing filtration areas for the passage therethrough of carrier liquid from the slurry or suspension. For that purpose, the frame member is of outwardly open U-shaped profile adapted to accommodate the attachment thereto of the liquid permeable walls. Each of the liquid permeable walls is an assembly itself comprising a filter media 41 or filter cloth marginally fastened to the frame member as by means of holding strips 42.

Each of the filter media is backed against external pressure by a supporting grid 42a fixed or welded marginally to the surrounding frame member. These backup grids thus constitute part of the electrode structures, each representing a respective electrode face. With the grids and the filter media thus connected to the frame member, these electrode structures thus represent unobstructed planar faces P-1 and P-2.

Furthermore, these cathodic electrode structures 31 and 32 each have a terminal rod 45 with an electric cable connection 46 to provide the required polarity.

As indicated in FIGS. 1 to 4, these cathodic electrode structures all communicate with the aforementioned filtrate flow control system "S-1" whereby a pump 45a applies vacuum to the interior of these cathodic electrode structures by a connection 46a causing carrier liquid from the surrounding suspension or slurry to be drawn through the filter media, thus continuously filling the interior of the cathode structures, even as a pump 46b withdraws filtered carrier liquid from the interior through line 46c at a correspondingly balanced rate.

Assuming now that the dewatering operation is in balance, with the control system "S-1" effective to maintain a uniform filtration throughflow rate of carrier liquid through these cathodic electrodes, the operating cycle of the dewatering unit according to FIGS. 1 to 4 is as follows:

A slurry or suspension, for example a clay suspension, is supplied to the treatment tank continuously through inlet connections 11 at a rate sufficient to insure an excess to overflow continuously into receiving launder 13. This insures a sufficient volume of clay suspension for the electrode structures to have their effective electrode surfaces fully submerged in this suspension while in operation.

Thus, the electric field effective between respective electrodes, in the case of a clay suspension, will cause negatively charged colloidal clay particles to migrate relative to the carrier liquid towards the anodic electrode structure alternatively designated by the letter "A". Simultaneously, carrier liquid moves in the opposite direction, and then filtered through the hollow cathodic electrode structures discharges from the treatment system.

Figure 1:
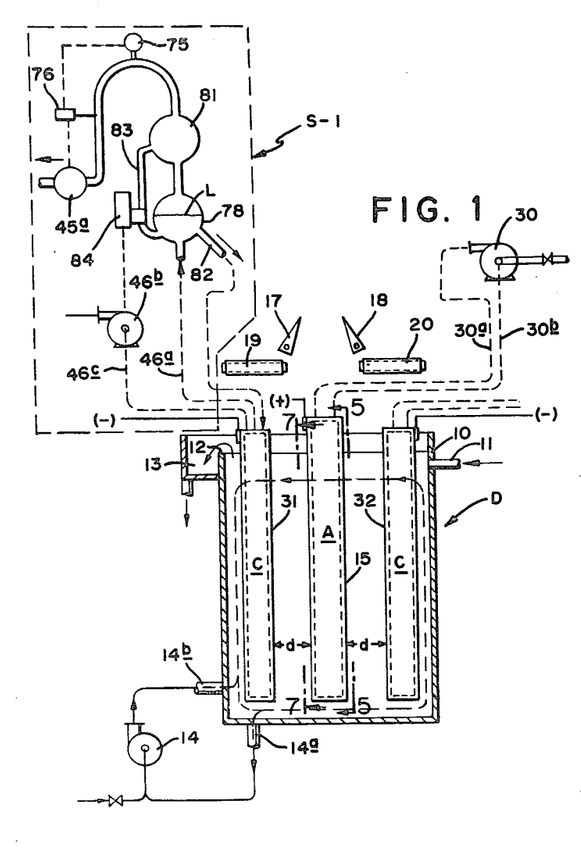
FIG. 1 shows the starting condition of the dewatering operation, with incipient cake formation appearing on the electrode surfaces of the respective self-contained electrode structure.

Accordingly, the FIG. 1 starting condition of the dewatering operation shows incipient formation of a cake layer on the anodic electrode surfaces, consisting of clay particles that have reached, and are now adhering to, the ion-pervious anode surface under the influence of the electric field.

At this time, the scrapers or doctor blades 17 and 18 are in neutral position, that is to say swung away from each other, in order to allow for subsequent upward passage between them of the anode structure when being raised for cake discharge.

Figure 2:
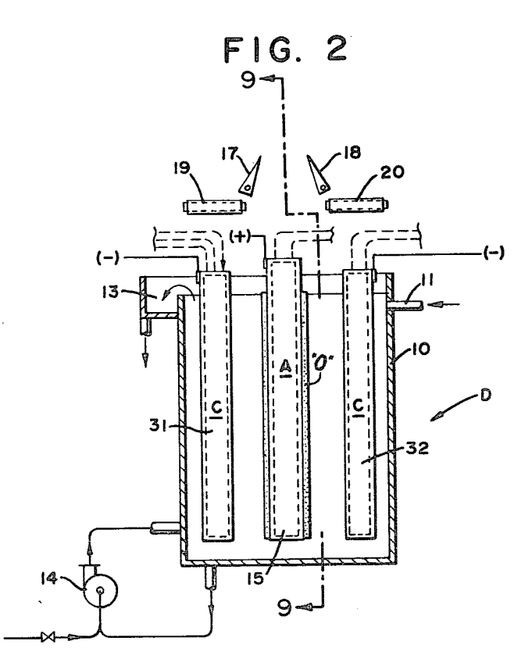
FIG. 2 shows the cake formation completed.
Figure 3:
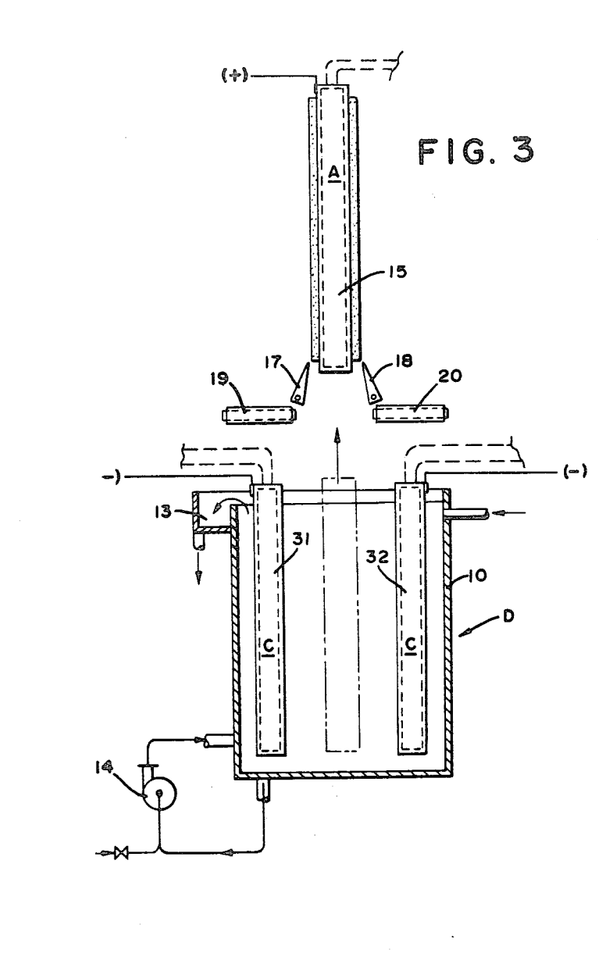
FIG. 3 shows the electrode structure being lifted to emergence for removal of the cake layer, with doctor blades kept in non-stripping position.

FIG. 2 shows the layer of cake formation "O" completed with the doctor blades still in neutral position to allow the cake carrying anode structure to be raised to a position of complete emergence such as illustrated in FIG. 3.

As the anode structure reaches its uppermost emergent position, the doctor blades are swung towards each other to cake stripping position preparatory to the next following downward return movement of the anode structure, illustrated as in FIG. 4. Thus, the cake layer is being stripped and delivered directly onto the bank conveyors 19 and 20. The end of this downward return movement restores the system to the starting condition, and the doctor blades to neutral position, for a renewal of the operating cycle.

Figure 9:
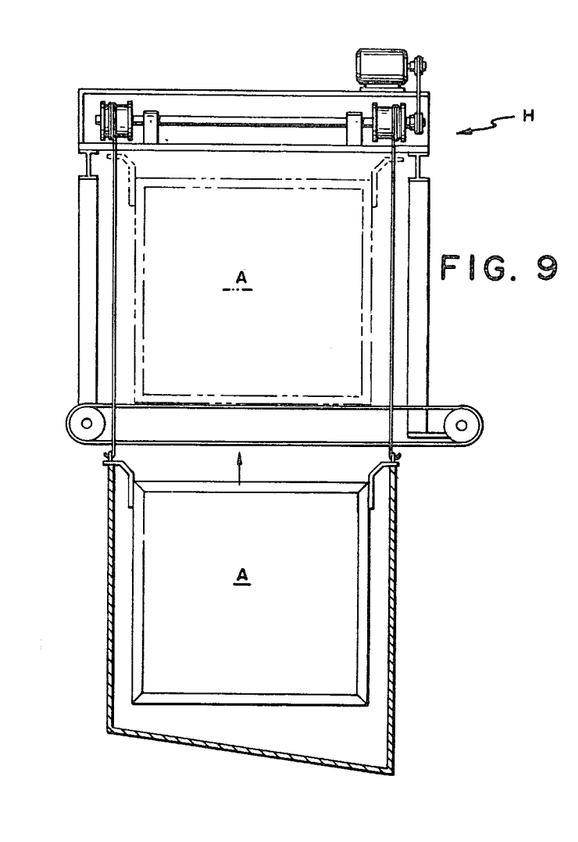
FIG. 9, is a view of the hollow anodic electrode structure similar to FIG. 5, with hoisting means for raising and lowering the same for purpose of cake removal.

FIG. 9 schematically illustrates hoisting means collectively designated "H" for raising and lowering of the anodic electrode structure incident to the cake stripping operation described above.

As initially indicated, the slurry or suspension to be thus dewatered, may be of the kind wherein the suspended solids carry a predominantly positive electric charge. In that case, under the influence of the electric field, these solids will migrate towards the negative polarity of a cathodic electrode structure. Simultaneously carrier liquid is being filtered and withdrawn through the hollow anodic electrode structures having the above described liquid permeable walls, and communicating with the above described control system "S-1" that regulates the filtrate throughflow rate.

Figure 10:
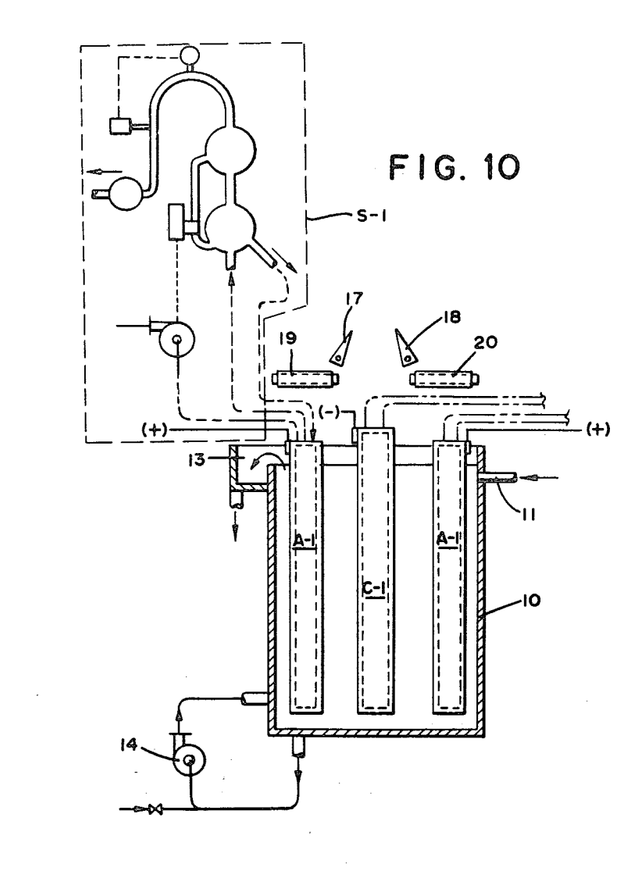
FIG. 10 is a view similar in appearance to the embodiment of FIGS. 1 to 4 including the control system, but functionally arranged for handling suspension solids carrying a positive electric charge.

Such an alternate operating condition as represented in FIG. 10, requires only to change polarities of the respective electrode structures in such a manner that the center electrode structure "A" now becomes a cathode designated as "C-1", while the two flanking cathode structures "C" now become anodes designated as "A-1".

Otherwise, the operating cycle is comparable to that described above relative to FIGS. 1 to 4, in that the central cathodic electrode structures C-1 can be raised and lowered for the cake stripping operation, while filtered carrier liquid is pumped from the interior of the two flanking anodic electrode structures "A-1" and "A-2" by the control system "S-1" at a regulated rate. However, in this instance, the anolyte must be composed of constituents such that oxygen is evolved at the anode.

FIG. 4a illustrates an alternative arrangement whereby the cake stripping itself is effected during the upward movement of emergence of the electrode structure instead of during the downward return movement to resubmergence as illustrated in FIGS. 1 to 4.

While this arrangement is largely self-explanatory, it will be seen that the scraper blades now pointing downwardly instead of upwardly, will strip the cake material during upward movement of the electrode structure, while the blades may be held in resiliently yieldable sliding contact with the electrode structure. As a matter of simplification, this sliding contact may be maintained even during the subsequent downward movement of the electrode structure now cleared of the cake material. Otherwise, a blade actuating mechanism may be employed similar to that outlined above in connection with FIGS. 1 to 4.

There now follows a description of an automatic filtrate flow control system "S-1" of FIG. 1 and marked by the broken line surrounding it. For the sake of explanation, it is assumed that the suspension thus to be dewatered be of the kind where the particles carry a negative charge, as is the case with a clay suspension.

In these controls, the invention may utilize an interrelationship that exists as between the applied and controllable current density causing the electric field, and the rate of migration of the suspended solids towards the anodic electrodes relative to the rate of movement of carrier liquid in the opposite direction towards and through the counter electrodes. That is to say, increasing the current density will correspondingly increase the relative velocity of the suspended solids towards the anode, and vice versa. Thus, a degree of blinding of the filter media of the cathode structure may be either discouraged or encouraged by respective changes of the current density. Hence, a respective lowered field density will allow some suspended particles to settle on the filter media.

In cases where an increase in current density may be such that no coat is formed on the filter media, due to the relatively higher induced speed of migration of the particles away from the filter media, that condition may be compensated for by an increase of the vacuum.

On the other hand, the filtrate pumping rate and the suspension feed rate may be varied relative to one another, in order to obtain the desired filtrate flow control effect.

In the simplified form presented schematically by this example, the principle of this automatic control system "S-1" is as follows:

According to one mode of operation, a constant vacuum is applied to the interior of the hollow cathodic electrode structure by vacuum pump 45a. A vacuum gauge 75 through relay device 76 may control the operation of the vacuum pump, for maintaining the vacuum at a desired constant value.

While the vacuum causes carrier liquid from the suspension to be filtered through the liquid permeable walls of the cathodic electrode structure, the pump 46b draws filtrate liquid from the cathodic electrode structures, pitted against the opposite force of the vacuum. As a governing control factor a filtrate level "L" is maintained by the vacuum in separating chamber 78 which communicates through pipe 46a with the interior of the electrode structure. Since this pipe terminates downwardly at the upper end of the electrode structure, it will draw a mixture of liquid and $H_2$-gas electrolytically generated at the cathode, into vacuum separation chamber 78 where the visible vacuum liquid level "L" is to be maintained. Gas is drawn off upwardly through a secondary separating chamber 81, while degassed filtrate is shown to gravitate back into the cathode structure as through a pipe 82. Parallel communication between the two chambers 78 and 81 is provided in a bypass connection 83 wherein the vacuum filtrate level "L" is undisturbed by bubbling or ebullition that may exist in separating chamber 78.

Relay device 84 responsive to excessive changes in the filtrate level "L", will adjust the filtrate pumping rate or output of pump 46b, so as to bring the filtrate level back into its normal range of admissible relatively minor fluctuations.

In rare cases when no coat is formed on the filter media of the cathode structure, should the throughflow resistance of the filter media increase, then the control system will increase the vacuum.

Balanced operation in turn requires that the rate of filtrate flow through the cathodic electrode should be adequate, but not so great as to hamper or interfere with the migration of the suspended negatively charged solids in the opposite direction towards the anodic electrode.

Yet, as above set forth for control purposes, the level responsive master control device 84 may relay its control impulses to vary the current density or electric potential applied to the electrodes, while maintaining an appropriate predetermined constant pumping rate along with a constant vacuum.

As indicated previously, manual control wherein the current density is regulated in response to visual observation of the slurry product (after make down) and other conditions, is entirely satisfactory in many applications.

As an example, using a clay suspension with its negatively charged clay particles, the starting sequence of preliminary steps requires that the hollow electrode structures be fixed in place, the treatment tank be filled with the clay suspension, and supplies of filtrate liquid or water sufficient to fill the cathode electrode structure system and anolyte sufficient to fill the anode electrode structure be available.

The system is filled by applying vacuum to the structures, such that the appropriate liquid is drawn from supply tanks into the electrode structures. When the electrode structures are filled the dewatering operation can begin.

The dewatering operation itself is started by applying power to the electrode structures causing liquid to flow through the cathode structures under the applied vacuum. The filtrate pump is turned on and its discharge rate adjusted so as to maintain withdrawal at a relatively constant predetermined amount of filtrate. Also at start-up, the electrolyte pump 71 is actuated to cause the electrolyte to flow through the anode structures.

The operation of the dewatering system is stopped by turning the power to the electrodes off, and pumping the liquid out of the electrode structures. When the electrode structures are empty as indicated by no pump output, the vacuum is turned off, and then the pumps are shut down.

The following examples of operation of the system of the invention are offered:

EXAMPLES

An electrically augmented vacuum filter of the type shown schematically in FIGS. 1-8 is operated using a feed slurry of a No. 1 coating clay which is 59% solids, by weight. The total active area available for cake deposition is 24 square feet (two anodes, each with two active surfaces). The anolyte employed is a 1 N solution of NaCl which is circulated through the anode at the rate of 0.25 gpm (gallons per minute) per square foot of anode area. A vacuum of about 20 inches of mercury is maintained on the filtrate (cathode) system while the vacuum on the anolyte system is approximately 16 to 17 inches of mercury. In making test runs, the current is set at a desired level together with a predetermined bath temperature and salt addition, and the loading is then adjusted to achieve equilibrium. The salt addition is made to simulate possible variation in the salt content of the feed material or salts added as flocculants or dispersants, or for other purposes, in the prior treatment of the feed. In the following table, operating results are shown under equilibrium conditions:

| Run No. | Loading #/Hr.(Dry) | Current Amps | Bath Temp °F. | Added Salt #/Dry Ton | Cake Solids % by Wt. | Loading Energy KWH/Ton | Energy for Filtrate KWH/KGal |
|---|---|---|---|---|---|---|---|
| 1 | 252 | 200 | 130 | 4 | 78 | 15.4 | 287 |
| 2 | 397 | 320 | 130 | 2 | 79 | 25.0 | 433 |
| 3 | 308 | 200 | 110 | 2 | 77 | 14.2 | 259 |
| 4 | 566 | 320 | 110 | 0 | 80 | 23.9 | 420 |
| 5 | 515 | 320 | 130 | 2 | 81 | 23.1 | 431 |
| 6 | 448 | 320 | 130 | 2 | 79 | 24.2 | 429 |
| 7 | 554 | 320 | 150 | 0 | 80 | 19.7 | 324 |
| 8 | 380 | 320 | 150 | 4 | 80 | 22.3 | 374 |
| 9 | 457 | 200 | 130 | 0 | 81 | 11.0 | 188 |
| 10 | 586 | 440 | 110 | 2 | 83 | 34.9 | 631 |
| 11 | 382 | 320 | 110 | 4 | 82 | 26.6 | 484 |
| 12 | 820 | 440 | 130 | 0 | 82 | 27.2 | 443 |
| 13 | 357 | 220 | 150 | 2 | 78 | 11.3 | 183 |
| 14 | 455 | 440 | 130 | 4 | 80 | 36.6 | 589 |

Cycle time: 270 seconds

KWH: Kilowatt Hours
: Pounds

After make down, satisfactory product slurries having 70% solids are produced from all of the above runs.

It is seen that an 80% solids cake, itself a highly desirable material, is also well within the capability of this process. The process is shown to be flexible in that it is effective over a wide range of process conditions, including substantial variation in feed rates. It is noted that where conductivity of the slurry is low (at low or no salt addition and at lower bath temperatures) the process is somewhat more efficient than with slurries having a higher conductivity. The process consumes substantially less energy than the thermal dewatering commonly practiced in the industry.

From the foregoing it should also be understood that in the operation of the electrically augmented vacuum filter of this invention, which may also be termed an electrofilter for solids-liquid separation, electrodeposited solids can be recovered directly from a colloidal feed suspension in the form of a firm or relatively hard cake formation of very low moisture content, which may represent a desired product of itself.

Alternatively, recovered cake material may be blended with feed slurry or overflow suspension from the treatment tank in proportions such as to obtain a slurry of a specified higher solids concentration as the desired product.

Yet, by way of another alternative, the operation of the electro-dewatering apparatus may be conducted in a manner whereby the overflow suspension itself is obtainable as the product in the form of a slurry of a desired solids concentration, with any solids deposits or cake formation on the electrodes being incidental or minimized.

For best results, the feed suspension for the electroseparating operation may require preconditioning with a dispersing agent to establish a suitable suspension. In these conditions, the electrofilter is capable of what, figuratively speaking, may in effect amount to high rate filtration of otherwise difficult to filter colloidal suspensions. This, again, is in contrast with the coagulation pretreatment required of a feed suspension to be subjected to separation or solids concentration in customary filtration equipment.

What is claimed is:

1. The method of electrically augmented vacuum filtration of a suspension of solids in a carrier liquid, which comprises, providing and maintaining a body of the suspension of a predetermined at least minimum depth, establishing in said body an electric field between a pair of opposed, hollow, electrode structures, the energy of said field being such as to cause solids migrating in one direction relative to the carrier liquid to form a cake layer on the ion-permeable surface of a first of said electrode structures, the other electrode structure having a liquid permeable surface for carrier liquid to pass therethrough, simultaneously filtering carrier liquid under vacuum through said liquid permeable surface, thus delivering the resulting filtrate liquid separated from the suspension, passing an electrolyte continuously through said first electrode structure to immerse the electrode element therein in a compatible electrolyte of an essentially constant composition, applying a vacuum to said electrolyte to remove gases evolved at said electrode element and detaching said cake material from said first electrode structure, and recovering the detached cake material.

2. The method according to claim 1, wherein said cake material is detached from said first electrode structure after raising the electrode structure from submergence to emergence, and during return of said structure to submergence.

3. The method according to claim 1, wherein said cake material is detached from said first electrode structure while being raised to emergence, and thus before being returned to submergence.

4. The method according to claim 1, wherein said cake material is detached from said first electrode structure during exposure thereof from said suspension.

5. The process of claims 2, 3 or 4 wherein vacuum is maintained on said electrolyte within said first electrode structure during emergence from said suspension and cake removal to remove gases evolved at said electrode element and prevent stress on the walls of said structure due to internal fluid pressure.

6. The method of dewatering a suspension, which comprises, providing and maintaining an everchanging body of the suspension, of a predetermined at least minimum depth, establishing in said body an electric field of controllable intensity between a pair of opposed permeable electrode structures, the energy of said field causing solids to migrate toward and deposit on the ion-permeable surface of an anodic electrode structure and the carrier liquid to flow toward and through the liquid permeable surface of a cathodic electrode structure, applying vacuum to the interior of said cathodic electrode structure to promote permeate flow through said liquid permeable surface, pumping carrier liquid permeate from the interior of said cathodic electrode structure at a flow rate balanced against the rate of migration of the solids relative to the carrier liquid, continuously pumping an electrolyte into said anodic electrode structure to immerse the anode element within said structure in fresh electrolyte to facilitate migration of ions to said anode element and simultaneously subjecting said electrolyte to vacuum to remove gas evolved at said anode element, lifting said anodic electrode structure from said body of the suspension while maintaining vacuum on said electrolyte within said anodic electrode structure to prevent loss of electrolyte and damage to said liquid permeable surface, detaching the cake material deposited on said anodic electrode structure and recovering the detached cake material.

7. The method of claim 6 including the step of conducting the gas evolved at said anode element to the cathode element, said gas being chlorine and the chlorine effectively suppressing evolution of hydrogen at said cathode element.

* * * * *